C. D. WOODRUFF,
Assignor of one-half interest to D. H. HANSELL.
Core-Anchor and Stud.
No. 9,103. Reissued Mar. 2, 1880.
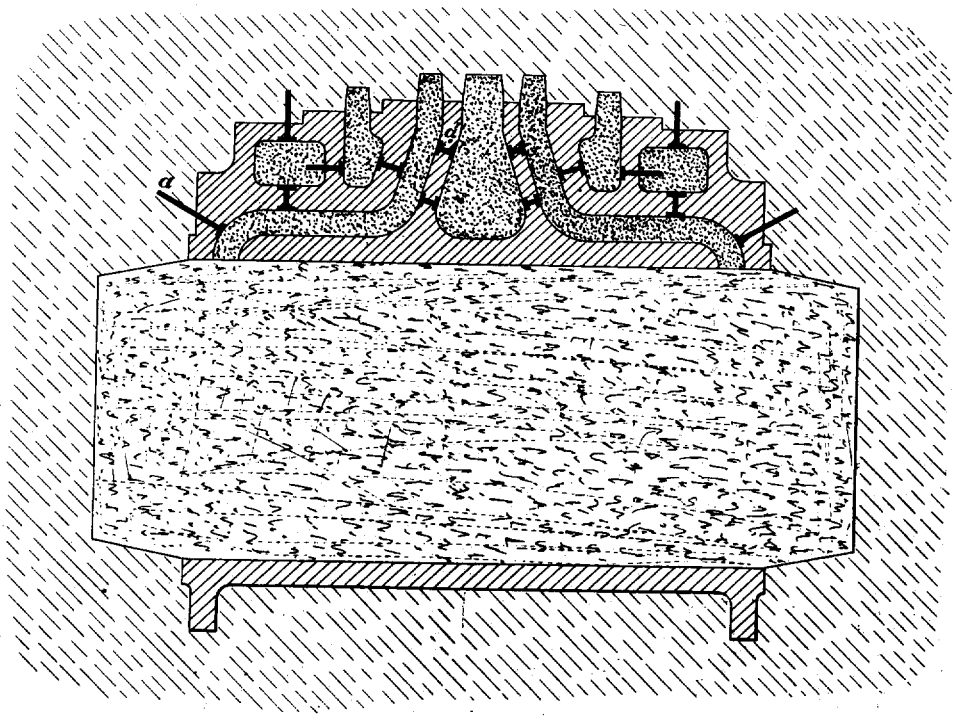
Witnesses:
A. P. Grant,
W. F. Kircher
Inventor:
Charles D. Woodruff,
by John A. Wiedersheim
ATTORNEY.
N. PETERS, PHOTO-LITHOGRAPHER, WASHINGTON, D. C.

UNITED STATES PATENT OFFICE.

CHARLES D. WOODRUFF, OF PHILADELPHIA, PA., ASSIGNOR OF ONE-HALF INTEREST TO DAVIS H. HANSELL, OF SAME PLACE.

CORE ANCHOR AND STUD.

SPECIFICATION forming part of Reissued Letters Patent No. 9,103, dated March 2, 1880.

Original No. 214,270, dated April 15, 1879. Application for Reissue filed December 15, 1879.

*To all whom it may concern:*

Be it known that I, CHARLES D. WOODRUFF, of the city and county of Philadelphia, and State of Pennsylvania, have invented a new and useful Improvement in Core Anchors and Studs, which improvement is fully set forth in the following specification and accompanying drawing, in which the figure, which is a vertical section, shows a well-known method of casting a piston-cylinder and base or port portion of the steam-chest with core anchors and studs in position.

For supporting and retaining sand cores in molds for iron or steel castings, anchors or studs of wrought and cast iron and steel have been used.

Cast-iron anchors or studs are often melted by the molten metal poured into the mold before the mold is full, and the cores are washed from their proper places by the inflowing metal, and an imperfect casting is the result. When the mold is filled without melting the anchors or studs the latter are held in the casting by the contraction of the molten metal around them.

When wrought-iron or steel anchors or studs are oxidized and surrounded with molten metal and their surfaces are brought by the inflowing metal to a welding temperature, they will not unite with the metal surrounding them, but cavities are formed around such anchors or studs, making the casting defective.

Various substances have been employed as coatings for anchors or studs to remedy the aforementioned defects, among which may be mentioned red lead, pulverized coal and plumbago, clay-washes, and tin.

Tin melts at a temperature less than the ovens in which loam molds are dried, and thus does not prevent the oxidation of the anchors or studs used in such molds. Steel, when not oxidized, and having its surfaces raised to a welding temperature, will unite with the molten iron or steel surrounding it.

In molds formed of damp sand or loam the anchors or studs supporting and retaining sand cores in such molds, unless protected by a coating, become oxidized before the molds are filled by the molten metal.

The object of my invention is to make a perfect union of the metal anchors or studs with the metal cast around them; and the invention consists of an anchor and stud formed of steel having a coating of hard metal which is non-oxidizable, melts at a temperature a little less than molten iron or steel, and acts as a solder.

Referring to the drawing, in which I illustrate a well-known method of casting a piston-cylinder and the base or port portion of the steam-chest, the cores for the cylinder, live-steam and exhaust ports, and weight-lessening cavities are shown by dots, the sand or loam of the mold is represented by dashes, and the cylinder and base or port portion are illustrated in section.

The cores of the aforesaid ports and cavities are sustained by anchors and studs, as required, *a* representing one of the anchors and *a'* one of the studs.

In carrying out my invention I coat or plate the anchors or studs with a hard metal, which forms a perfect coating therefor, is non-oxidizable, melts at a temperature a little less than molten iron or steel, and acts as a solder, making a perfect union of the anchor or stud with the molten metal surrounding it.

One of the hard metals I use for the aforesaid coating purposes is silver.

I am aware that it is not new to prepare wrought metal for combining it with metal which is to be poured around it in the mold by coating it with material not easily oxidizable and difficult to fuse, and disclaim such feature; but I am not aware that anchors and studs which are inserted in molds for retaining and supporting sand cores have been made of steel with a hard-metal solder-coating, so as to cause a perfect union of the anchors and studs with the molten metal surrounding them.

Having thus described my invention, what I claim as new, and desire to secure by Letters Patent, is—

A steel core anchor or stud having a hard-metal solder-coating, substantially as and for the purpose set forth.

CHARLES D. WOODRUFF.

Witnesses:
GEO. B. MURRAY,
RUBEN H. WALTER.